United States Patent
Kirchner et al.

(10) Patent No.: US 6,263,370 B1
(45) Date of Patent: Jul. 17, 2001

(54) TCP/IP-BASED CLIENT INTERFACE TO NETWORK INFORMATION DISTRIBUTION SYSTEM SERVERS

(75) Inventors: Michael C. Kirchner, Cedar Rapids, IA (US); David C. Scharf, Dallas, TX (US); Thomas J. Herder, Cedar Rapids, IA (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 08/923,622

(22) Filed: Sep. 4, 1997

(51) Int. Cl.[7] .................................................. G06F 15/16

(52) U.S. Cl. ........................... 709/230; 709/219; 709/229

(58) Field of Search ..................................... 709/229, 228, 709/227, 226, 237, 236, 219, 230; 370/465, 469, 471

(56) References Cited

U.S. PATENT DOCUMENTS

| | | | |
|---|---|---|---|
| 4,922,486 | * | 5/1990 | Lidinsky et al. ...................... 370/427 |
| 5,345,396 | * | 9/1994 | Yamaguchi ........................... 709/237 |
| 5,436,627 | * | 7/1995 | Motoyama et al. .................... 341/67 |
| 5,438,650 | * | 8/1995 | Motoyama et al. .................. 707/524 |
| 5,638,066 | * | 6/1997 | Horiuchi et al. ..................... 370/476 |
| 5,706,437 | * | 1/1998 | Kirchner et al. ..................... 709/227 |
| 5,764,915 | * | 6/1998 | Heimsoth et al. .................... 709/227 |
| 5,875,178 | * | 2/1999 | Rahuel et al. ........................ 370/471 |

OTHER PUBLICATIONS

Cheah, R. S.–S. et al.; "Implementation of OSI application layer using ISO Development Environment"; IEEE International Conference on Information Engineering; ISBN 0–7803–1445–X; pp. 28–33, v1, Sep. 1993.*

Cheah, R. S.–S. et al.; "Implementing Manufacturing Message Specification services and protocol using ISO Development Environment"; IEEE Region 10 Conference on Computer, Communication, Control, and Power Engineering; ISBN 0–7803–1233–3; pp. 553–556, v1, Oct. 1993.*

Steven, Richard W.; "TCT/IP Illustrated, vol. 1, The Protocols"; Addison–Wesley Publishing; ISBN 0–201–63346–9; Chapters 1, 17, 25, 28, Dec. 1994.*

Stark, Thom; "Internet Mail is a MIME field"; LAN Times; McGraw–Hill Inc.; Feb. 5, 1996 v13, n3, p110(1), Feb. 1996.*

* cited by examiner

Primary Examiner—Robert B. Harrell
Assistant Examiner—Marc D. Thompson

(57) ABSTRACT

A TCP/IP-based client-server interface for sending service requests from a client computer to a Network Information Distribution Services server. The TCP/IP-based client-server interface is an easily implemented and economical alternative to the proprietary UDP/IP-based client-server interface developed for communication between client computers and Network Information Distribution Services servers. A service request is sent to a specific TCP/IP logical port associated with a particular type of service. A process associated with the specific TCP/IP logical port formats the request in the same manner as requests received through the proprietary UDP/IP-based client-server interface are formatted, and then directs the formatted requests to the Network Information Distribution Services server process that executes the requests.

10 Claims, 11 Drawing Sheets

TCP/IP-BASED CLIENT INTERFACE TO NETWORK INFORMATION DISTRIBUTION SYSTEM SERVERS

TECHNICAL FIELD

The present invention relates to client-server communications interfaces and, in particular, to a TCP/IP interface between client computers and Network Information Distribution Services servers.

BACKGROUND OF THE INVENTION

MCI Communications Corporation provides operator services and customer services through intelligent services networks ("ISNs"), commonly known as call centers. An ISN includes various electronic devices that provide telephone services to telephone callers and that are connected to an external public switched telephone network ("PSTN"). These electronic devices include audio response units ("ARUs") and operator consoles. ARUs provide automated voice messages to telephone callers. Operator consoles are used by telephone operators to provide directory assistance to telephone callers. The electronic devices are also connected to an internal local area network ("LAN") or to a wide area network ("WAN") over which they access and use services provided by Network Information Distribution Services ("NIDS") servers.

Software application programs running on computer components of the electronic devices access NIDS servers over the LAN or WAN through an MCI proprietary messaging protocol referred to as the NIDS sequenced packet protocol ("NSPP"). NSPP is a session-oriented packet exchange protocol that is implemented on top of an underlying UDP/IP communications interface. NSPP is designed to allow rapid information exchange between software application programs and NIDS services.

In order to employ the NSPP protocol, a software application program must include between 2,000–3,000 lines of specialized source code that implement the client portion of the NSPP protocol. This source code must be implemented specifically for each different type of software application program.

It is desirable for NIDS servers to be accessible to new clients that do not use and support the NSPP interface. Retrofitting the software application programs of these new clients to support NSPP, or rewriting the new clients' software application programs, is a prohibitively expensive process. It is also desirable to develop new software application programs for existing clients without implementing a NSPP protocol interface specifically for each new software application program. A need has been therefore recognized for a way to provide access to NIDS servers through a communications mechanism that does not require clients to implement and use the NSPP protocol.

SUMMARY OF THE INVENTION

The present invention provides a NIDS TCP/IP client-server interface between client software application programs and call center server computers. A call center server computer provides a number of services, including database services and telephone communications support services. Each service provided by a call center server computer provides various specific services that can be requested by client software application programs through the TCP/IP client-server interface. A client software application program requests services by choosing a service from among the services provided by the call center server computer and selecting a TCP/IP logical port address that corresponds to the selected service. The client software application program then requests a TCP/IP connection to the selected TCP/IP logical port address via a TCP/IP socket on the client computer. Once a connection is established, the client software application program prepares a service request message by collecting data that describes the service request, formatting the collected data in a format required by the chosen service, constructing a NIDS message header, and affixing the NIDS message header to the formatted data. The client computer then transmits the service request message to the selected TCP/IP logical port address.

Formerly, a software application program could access a call center server computer only through the NSPP communications interface. This required each software application program to include specialized source code to implement a client NSPP layer on top of UDP/IP. The present invention provides a much simpler NIDS TCP/IP client-server interface to call center server computers. TCP/IP is an open, industry standard protocol that is supported by most modern computer operating systems.

DETAILED DESCRIPTION OF THE INVENTION

The present invention provides a NIDS TCP/IP client-server interface between client software application programs and the NIDS information storage and retrieval system. The TCP/IP client-server interface of the present invention provides an alternative to a proprietary NSPP client-server interface implemented using UDP/IP. The TCP/IP client-server interface of the present invention provides an easily-implemented and economical interface that allows new clients that do not support NSPP to access services provided by NIDS servers. The TCP/IP client-server interface is also useful for developing new services and new applications for existing clients as well as new clients, because specialized NSPP software is not needed for each new service and for each new application.

The TCP/IP client-server interface is implemented by assigning a unique TCP/IP logical port to each different NIDS service. Requests directed to a particular NIDS service are sent directly by a client to the TCP/IP logical port on a NIDS server associated with that particular NIDS service. A process running on the NIDS server is devoted to receiving requests for the particular service from the TCP/IP logical port, packaging the requests in the same way that the request would have been packaged had it been received through the NSPP client-server interface, and passing the packaged request on to a NIDS server process that executes the requests for the particular service. Thus, the client does not need to package requests into NSPP messages, and does not need a UDP/IP interface.

Figure 1:
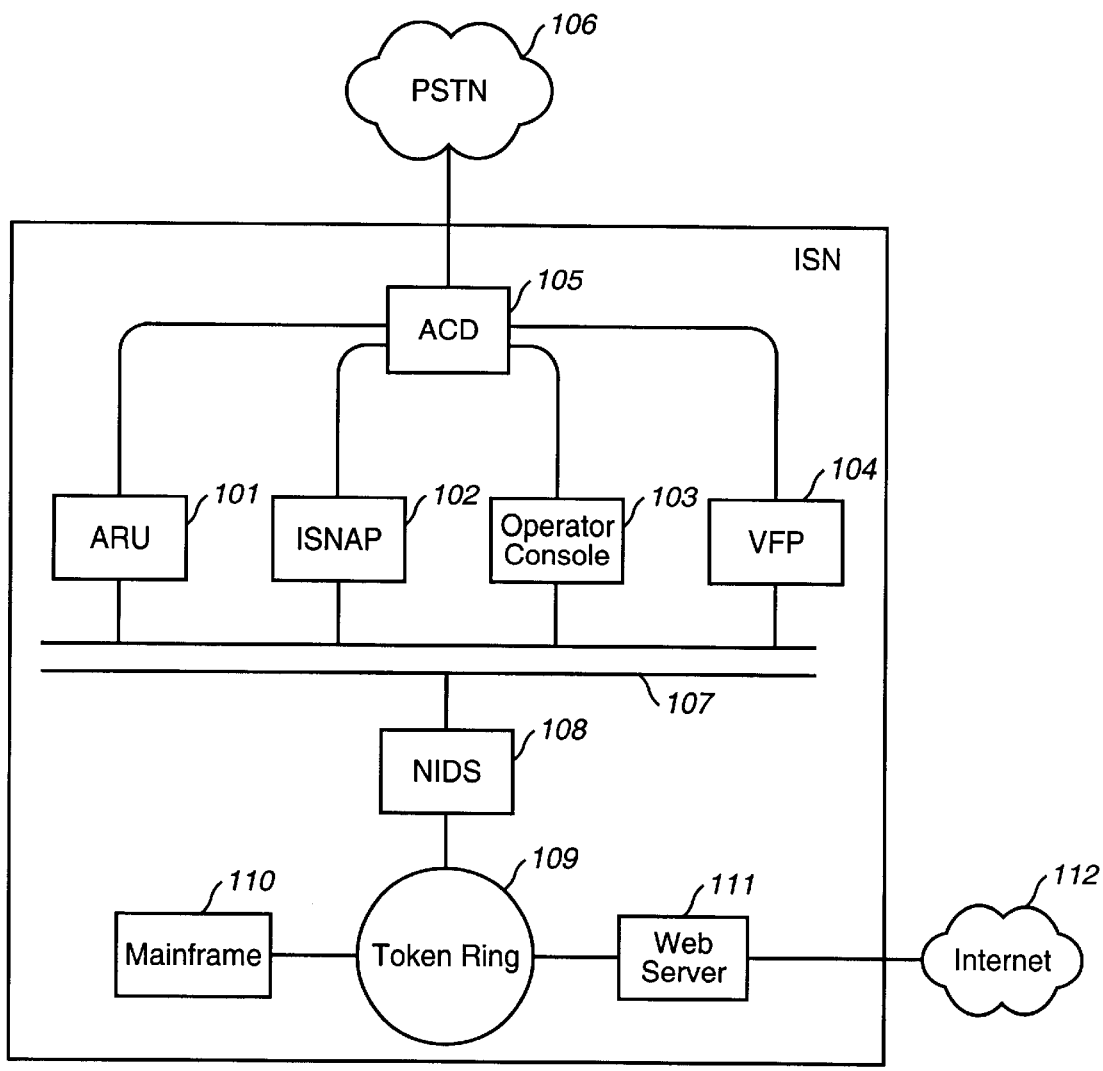
FIG. 1 displays the network architecture of an ISN.

FIG. 1 displays the network architecture of an ISN. An ISN includes a number of different types of client devices 101–104 connected through an automated call distributor ("ACD") 105 to an external PSTN 106. Each type of client device provides one or more high-level services to telephone customers that access the ISN through the PSTN. Client devices may include audio response units ("ARUs") 101 that provide automated operator and other call services, ISN application processors ("ISNAPs") 102 that provide switch services between the ACD and other call processing components, operator consoles 103 that provide manual call processing functions to assist human operators, and voicemail/faxmail platforms ("VFPs") 104 that provide voicemail and fax call services. These client devices are also connected to a LAN 107.

The client devices access and make use of services provided by one or more NIDS servers 108. Each NIDS server is a mid-range computer containing one or more databases. Each database is used to provide one or more services to software application programs running on the client devices. These databases contain information such as customer records, ANI screening databases, validation and authorization data, customer accounts and profiles, and data needed for real-time call processing. A NIDS server is also connected to a token ring WAN 109 that provides access to both a mainframe computer 110 and a web server 111. The web server in turn provides access to an external Internet 112. The NIDS server accesses order entry systems on the mainframe computer and maintains customer-generated information collected over the Internet by the web server. A NIDS server collects information gathered from client devices, the mainframe computer, and the web server, and makes this information available, in turn, to client software application programs either over the LAN or over the Internet.

NIDS servers are used in many different ways. For example, MCI offers a service called Directline, which provides subscribers with several communications services, all of which can be accessed with a single telephone number. Operator consoles 103 and ARUs 101 in the ISN process calls for Directline subscribers using instructions contained in subscriber profiles. Subscriber profiles are kept in a NIDS server database. Directline also allows subscribers to update their profiles via the Internet by logging onto MCI Directline's web site. The web server 111 uses a NIDS server 108 to retrieve subscriber profiles for display and updating. Thus, in order to support Directline, several types of client devices and the web server store and retrieve subscriber profiles using a NIDS server. As another example of the use of NIDS servers, operating consoles 103 provide directory assistance to customers by retrieving the phone number for a requested party from a NIDS server database containing phone numbers indexed by name.

In the following discussion of FIGS. 2A–C and 3A–C, a detailed description of the NSPP-based client-server interface will be contrasted with a detailed description of the TCP/IP-based client-server interface. These detailed descriptions demonstrate how the TCP/IP-based interface, by using a port-per-server architecture and NIDSCOM processes running on the NIDS server that are tightly coupled with TCP/IP logical ports, achieves a client server communications capability equivalent to that provided by the NSPP-based client-server interface.

Figure 2A:
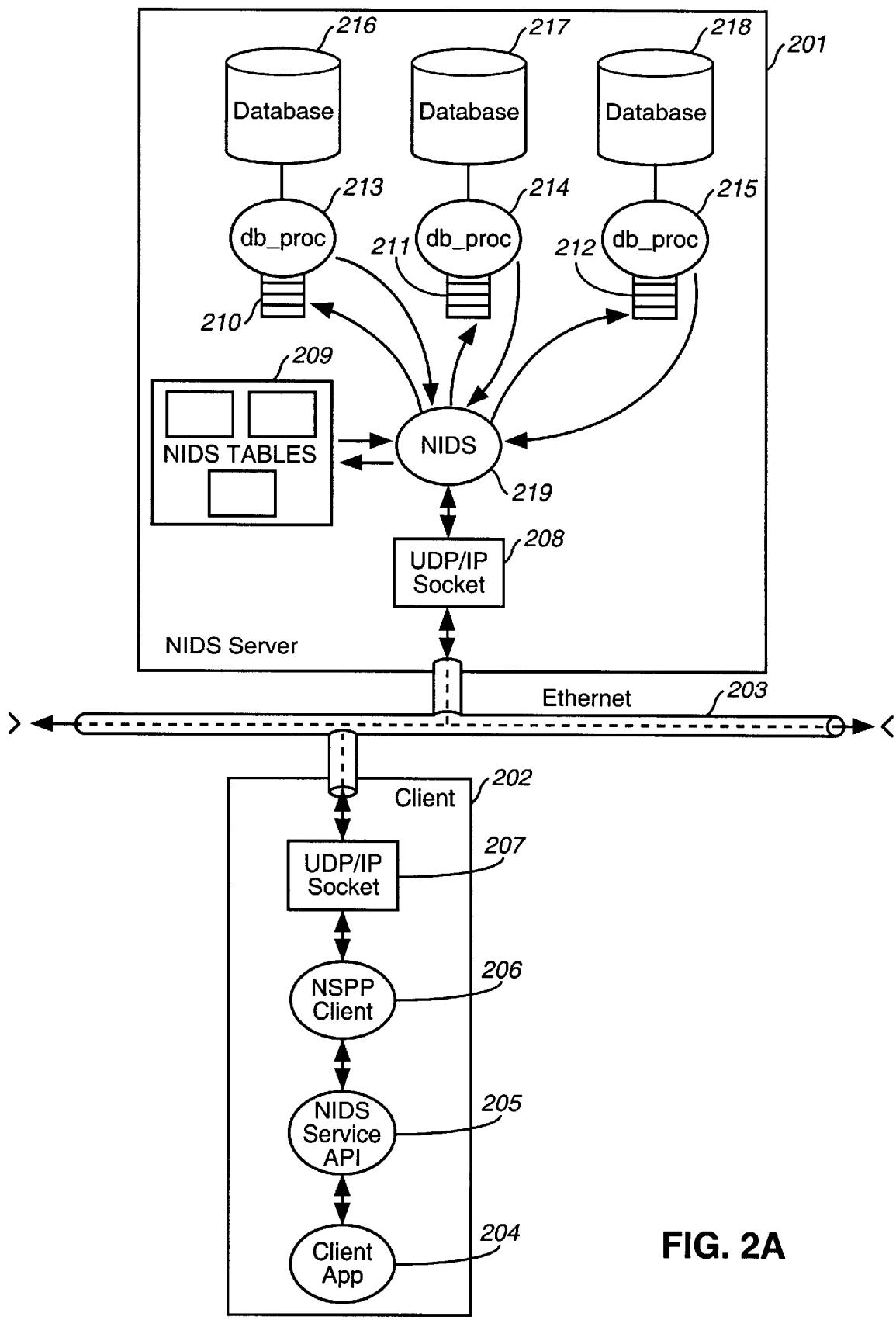
FIG. 2A displays the basic internal software components of clients and NIDS servers that use the NSPP client-server interface.

FIG. 2A displays the basic internal software components of client devices and NIDS servers using the NSPP-based client-server interface. Both the NIDS server 201 and the client device 202 are connected to an Ethernet LAN 203. A software application program 204 running on the client device sends a request for service to a NIDS process 205 running on the NIDS server 201 over the Ethernet 203. Responses to those requests and acknowledgments of information received from the client software application program are sent by the NIDS process 219 to the software application program 204.

Figure 2B:
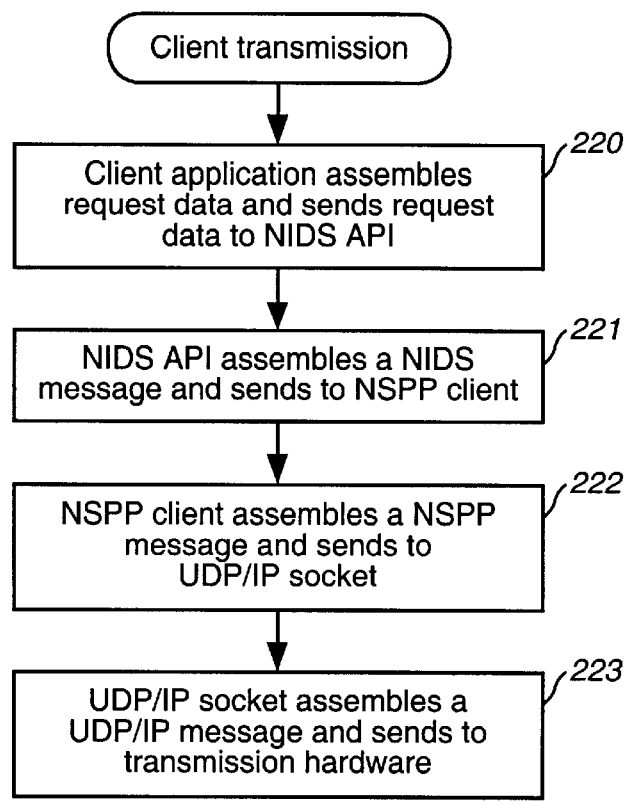
FIG. 2B displays a simple flow-control diagram for NSPP-based client-to-server data transmission.
Figure 2C:
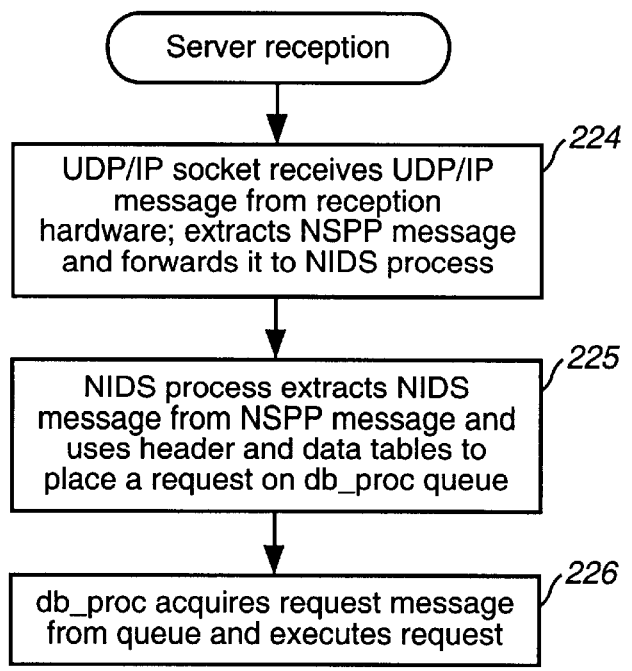
FIG. 2C displays a simple flow-control diagram for NSPP-based data reception by a server.

FIGS. 2B and 2C display simple flow control diagrams for client-server request transmission and request execution. FIGS. 2B and 2C provide an overview for the more detailed discussion of FIG. 2A that follows. In step 220 of FIG. 2B, the client application 204 assembles the data corresponding to a service request and passes the request data to the NIDS application programming interface ("NIDS API") 205. In step 221, the NIDS API constructs a NIDS message from the request data and passes the NIDS message to the NSPP client 206. In step 222, the NSPP client packages the NIDS message into a NSPP message, and passes the NSPP message to the UDP/IP socket 207. In step 223, the UDP/IP socket packages the NSPP message into a UDP/IP message that it sends over the Ethernet 203 to the UDP/IP socket of the NIDS server. In step 224 of FIG. 2C, the UDP/IP socket of the NIDS server 208 receives the UDP/IP message transmitted by the client, extracts from the UDP/IP message the NSPP message prepared by the client NSPP, and passes the extracted NSPP message to the NIDS process 219. In step 225, the NIDS process uses the information in the NSPP message header and the NIDS message within the NSPP message to place the client's request into a service queue 210–212 associated with a db_proc process 213–215. In step 226, the db_proc process retrieves the request from the service queue and executes the request.

In the following detailed discussion of FIG. 2A, the flow of requests and responses through the components of the client and NIDS server shown in FIG. 2A will be described. In order to send a request for service, the software application program 204 calls functions provided by the NIDS-API 205, passing to the NIDS API the data that represents the request for service. The NIDS API uses information provided by the software application program through the function call to construct a NIDS message header and affixes the NIDS message header to the request data to produce a NIDS message. The NIDS API then passes the NIDS message to the NSPP client 206. The NSPP client is a set of software routines that construct an NSPP message that comprises the NIDS message along with an additional NSPP header. The NSPP client 206 then passes the NSPP message to a UDP/IP socket 207 that formats the NSPP message into a UDP/IP message that the UDP/IP socket sends over the Ethernet 203 to the UDP/IP socket 208 of the NIDS server.

The server's UDP/IP socket unpackages the NSPP message sent by the NSPP client and passes that NSPP message to the NIDS process 219. The NIDS process executes NSPP server software that extracts information from the NSPP header which the NIDS process uses, along with information stored in a number of NIDS tables 209, to direct the client software application program's service request to an appropriate service queue 210–212. Once on a service queue, a service request is handled by the db_proc process assigned to that service 213–215. Each db_proc translates the service request into a series of database transactions which the db_proc executes with respect to a specific database assigned to that service. In FIG. 2A, databases 216–218 maintain the information used by db_procs 213–215, respectively.

When a db_proc has completed executing a service request, the db_proc returns a response message to the NIDS process 219. The response message is packaged by the NIDS process into an NSPP message that is sent to the server's UDP/IP socket 208 for transmission over the Ethernet 203 back to the UDP/IP socket of the client 207. The NSPP message is unpackaged from the UDP/IP message received by the client's UDP/IP socket and passed to the NSPP client 206 running in the context of the client application. The NSPP client unpackages the NIDS message header and the response data from the NSPP message, and passes the header and response data to the NIDS API. The NIDS API then matches the response message to the original call made by the client application using information in the NIDS header and returns the response data to the client application 204.

The NSPP-based client-server interface requires that each client has the set of subroutines corresponding to the NSPP client 206 as well as UDP/IP socket software 207. On the server side, the NSPP client-server interface requires that all messages received from all clients are funneled through a single UDP/IP socket to a single NIDS process. The NIDS process handles the NSPP protocol. The NIDS process uses information contained in the NSPP headers of incoming and outgoing messages to maintain a number of tables by which the NIDS process keeps track of all the different clients and the state of their requests and directs individual service requests to their corresponding service request queues.

Figure 3A:
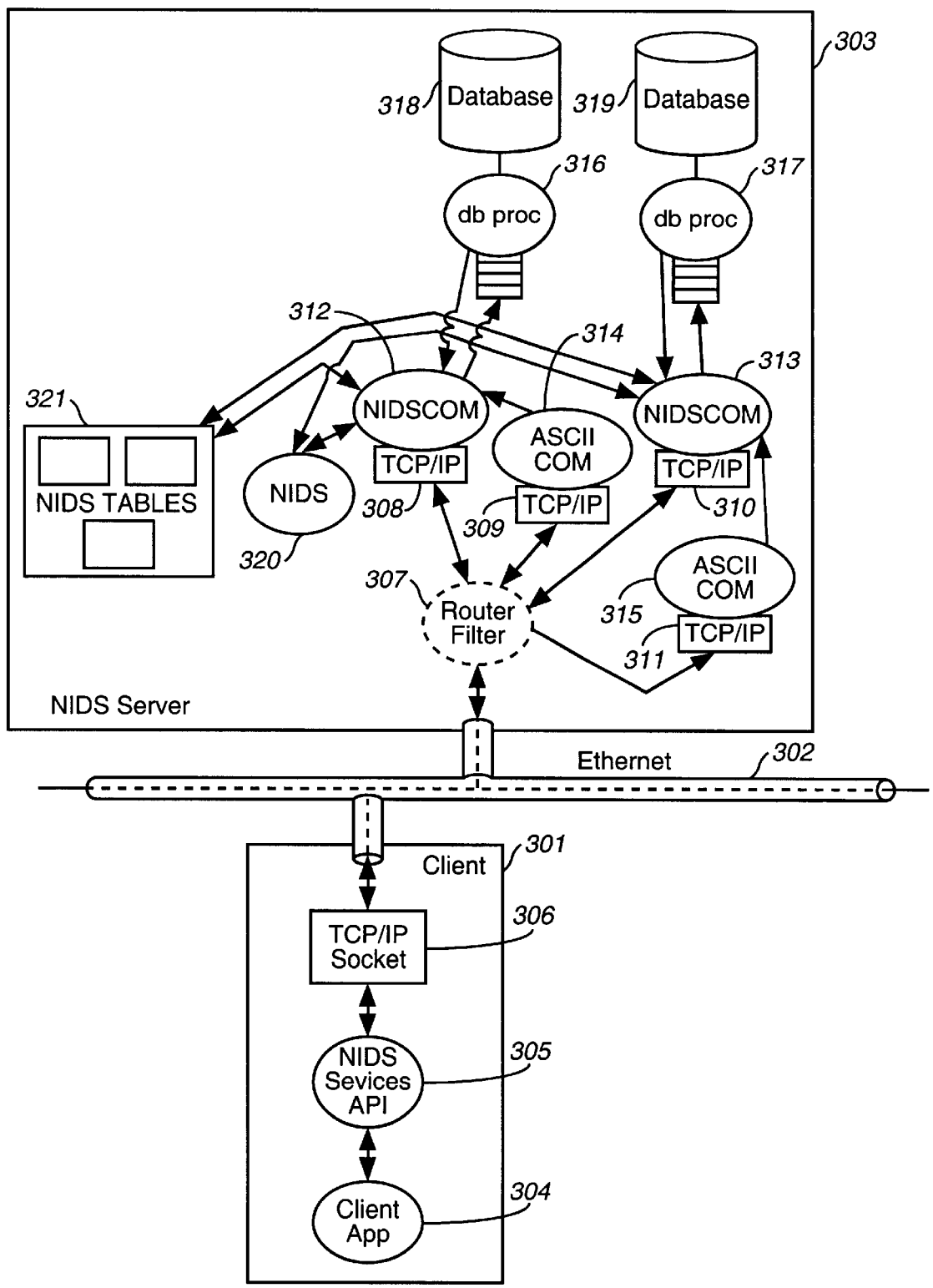
FIG. 3A displays the basic internal software components of clients and NIDS servers that use the TCP/IP client-server interface of the present invention.

FIG. 3A displays the basic software components of client devices and NIDS servers using the TCP/IP-based client-server interface of the present invention. As in the NSPP-based client-server interface, a client 301 sends service requests over an Ethernet 302 to a NIDS server 303.

Figure 3B:
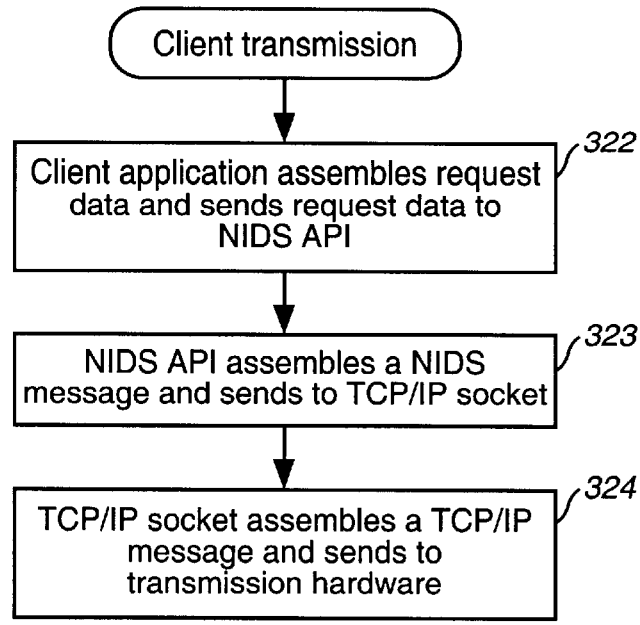
FIG. 3B displays a simple flow-control diagram for TCP/IP-based client-to-server data transmission.
Figure 3C:
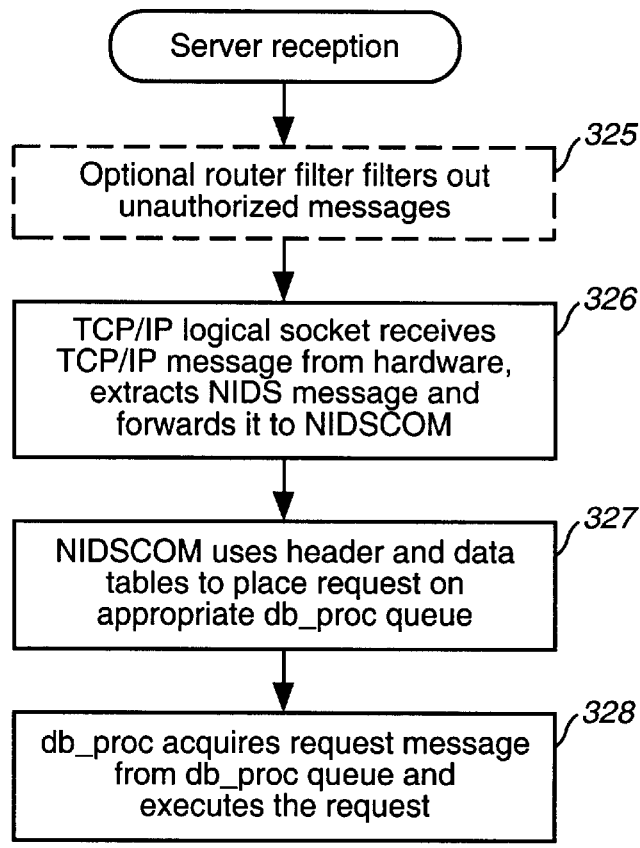
FIG. 3C displays a simple flow-control diagram for TCP/IP-based data reception by a server.

The mechanism for sending the service requests under the TCP/IP interface is quite different than in the NSPP-based client-server interface, as shown in overview in FIGS. 3B and 3C and discussed in greater detail below. In step 322 of FIG. 3B, the client application 304 assembles the data corresponding to a service request and passes the request data to the NIDS API 305. In step 323, the NIDS API constructs a NIDS message from the request data and passes the NIDS message to a TCP/IP socket 306. In step 324, the TCP/IP socket packages the NIDS message into a TCP/IP message that it sends over the Ethernet 302 to a particular TCP/IP socket of the NIDS server. In step 325 of FIG. 3C, an optional router filter process screens incoming TCP/IP messages for proper authorization. In step 326, the TCP/IP socket of the NIDS server to which the TCP/IP message was sent by the client receives the TCP/IP message transmitted by the client, extracts from the TCP/IP message the NIDS message prepared by the client's NIDS API 305, and passes the extracted NIDS message to a NIDSCOM process 312–313 associated with the TCP/IP socket. In step 327, the NIDSCOM process uses the information in the NIDS message to place the client's request into a service queue associated with a db_proc process 316–317. In step 328, the db_proc process retrieves the request from the service queue and executes the request.

In the following detailed discussion of FIG. 3A, the flow of requests and responses through the components of the client and NIDS server shown in FIG. 3A will be described. There is an optional process, called a router filter, on the NIDS server that, when present, intercepts all client TCP/IP messages received by the NIDS server over the Ethernet. The router filter is an optional security mechanism that matches the authorizations assigned to a particular client with the various services offered by the NIDS server. The router filter can detect a case where a client is requesting services that is has not been authorized to request, and can quickly reject such requests in order to secure the NIDS server and to avoid the overhead required to pass unauthorized requests further within the NIDS server.

Once TCP/IP messages have passed through the router filter, in the case that the router filter process is present, the TCP/IP messages are directed to the logical ports to which they have been addressed by the clients. There are a number of TCP/IP sockets 308–311 on the NIDS servers, each having a unique logical port address. Each service supported by the NIDS server is assigned at least one, and at most two, TCP/IP sockets. TCP/IP sockets having even-numbered logical port addresses interface directly to NIDSCOM processes 312–313. TCP/IP sockets having odd-numbered logical port addresses interface to ASCIICOM processes 314–315. The logical port addresses of the two TCP/IP sockets associated with a given NIDS service differ only in the least significant bit of the addresses.

The ASCIICOM processes are optional. They allow a client to send requests and receive responses using text-based messages. The ASCIICOM process receives a text-based message, constructs from the data within the message a NIDS header, affixes that NIDS header to data extracted from the text-based message and formatted for inclusion in a NIDS message, and passes the resulting NIDS message to the NIDSCOM process with which the ASCIICOM process is associated.

A NIDS service is provided by a db_proc process 316–317 that interacts with a database associated with the NIDS service 318–319. In FIG. 3A, two different NIDS services are displayed as components of the NIDS server. The first service comprises TCP/IP sockets 308 and 309, NIDSCOM process 312, ASCIICOM process 314, db_proc process 316, and database 318. The second NIDS service comprises TCP/IP sockets 310 and 311, NIDSCOM process 313, ASCIICOM process 315, db_proc 317, and database 319. The NIDS server contains the same NIDS process 320, along with NIDS data tables maintained by the NIDS process 321, which support the NSPP-based client-server interface displayed in FIG. 2. The NIDS server of FIG. 3A may have a UDP/IP socket in addition to the TCP/IP sockets displayed, and may simultaneously support the NSPP-based client-server interface in addition to the TCP/IP client-server interface of the present invention.

Using the TCP/IP-based client-server interface, a client's NIDS API is able to send a service request directly to a TCP/IP logical port corresponding to that service, rather than sending it to the single NIDS process 320 running on a NIDS server, as is done in the NSPP-based client-server interface. Thus, there is no need in the TCP/IP-based client-server interface for the NSPP client subroutines that package NIDS messages into the NSPP messages required by the receiving NIDS process. As can be seen by comparing the clients of FIGS. 2 and 3A, the client side software architecture for the TCP/IP-based client-server interface is simpler and more efficient than that for the NSPP-based client-server interface.

When a message containing a service request has been received by a NIDSCOM process running on a NIDS server, either directly through the TCP/IP logical port associated with a NIDSCOM process, or indirectly from the corresponding ASCIICOM process, the NIDSCOM process packages the request and places the message on the appropriate service queue in exactly the same manner as the request would have been packaged and placed on the service queue by the NIDS process in the NSPP-based client-server interface. NIDSCOM accomplishes this by directly interfacing with the NIDS process in some cases, and by accessing the NIDS data tables independently from the NIDS process in other cases. In a sense, each NIDSCOM process serves as a proxy or as an agent for the NIDS process with respect to the particular NIDS service with which the NIDSCOM process is associated. Whether arriving by the TCP/IP-based client-server interface via a NIDSCOM process or by the NSPP-based client-server interface via the NIDS process, service requests are handled identically by the db_proc that implements a service.

In the case of the TCP/IP-based client-server interface, the response data returned by the db_proc is directed back to the NIDSCOM process, whereas in the NSPP-based client-server interface, the response data is directed back to the NIDS process. The NIDSCOM process 312 accesses the NIDS data tables in order to determine how to construct a NIDS message to contain the response and to which TCP/IP logical port address the NIDS message should be sent. The return message is sent through the TCP/IP socket associated with the NIDSCOM process back through the Ethernet to the TCP/IP socket of the client 306 that had originally made the service request. The client's TCP/IP socket unpackages the NIDS message and passes the NIDS message to subroutines of the NIDS API 305. The NIDS API extracts the NIDS header from the NIDS message and uses the information in the NIDS message to pass the response data back to the requesting client application 304.

Figure 4:
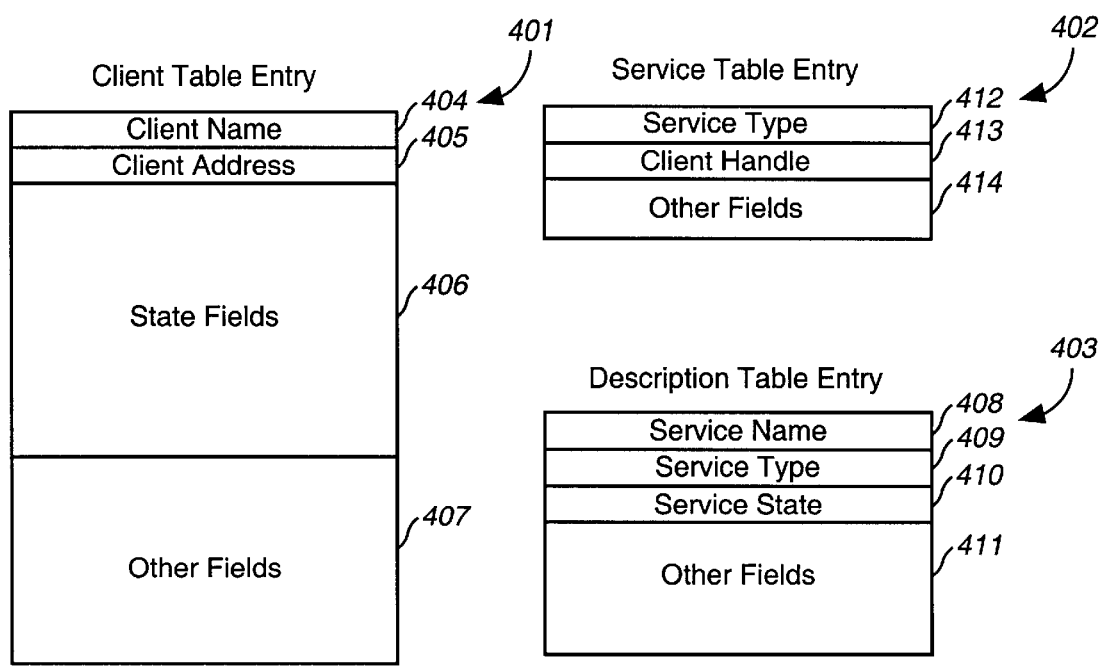
FIG. 4 displays three types of entries contained in three different NIDS data tables maintained by the NIDS process on a NIDS server.

FIG. 4 displays the three types of entries contained in the three different NIDS data tables maintained by the NIDS process. These tables include a client table, a service table, and a descriptor table. The client table comprises a number of client table entries 401. The service table comprises a number of service table entries 402. The descriptor table contains a number of descriptor table entries 403. There is one client table entry in the client table for every client connected to the NIDS server. There is one descriptor table entry in the descriptor table for every service provided by the NIDS server. There is one service table entry in the service table for every separate service connection made by every client currently connected to the NIDS server. A single client may have several different simultaneous connections, each of these connections directed to a different service provided by the NIDS server.

The fields within a client table entry 401 describe the client's name 404, its network address 405, and certain state information that describes the current state of the communications between that client and the NIDS server 406. There are, in addition, a number of other fields 407 used for storing information used by the NIDS process.

A descriptor table entry 403 describes a single NIDS service provided by the NIDS server. A descriptor table entry contains fields corresponding to the name of a service 408, the type of a service 409, and a state value that describes the service's current state 410, in addition to other implementation-dependent fields 411.

A service table entry 402 essentially relates one client table entry to one descriptor table entry. This relation describes a single service connection between a client and a NIDS server. Fields within the service table entry point to a descriptor table entry 412 and a client table entry 413 in addition to other implementation-dependent fields.

The information contained in the three NIDS data tables is used by the NIDS process to direct requests coming in over the UDP/IP socket to the appropriate service queues from which the db_procs corresponding to individual NIDS services acquire the requests. When a response is generated by a NIDS service, the NIDS process again uses the information stored in the NIDS data tables to package the response into an NSPP message and direct that NSPP message to the appropriate client.

A NIDSCOM process uses the NIDS data tables in a similar fashion. The NIDSCOM process is associated with a single service, so the service queue to which incoming requests need to be queued and from which service queue responses are received are acquired from the NIDS descriptor table by each NIDSCOM process. The NIDSCOM process uses the acquired service queue information, along with the information maintained in the NIDS data tables, to place incoming requests on the service queue associated with the NIDSCOM process using the exact same formats and headers that would result from the same service request being received via UDP/IP through the NIDS process.

Figure 5:
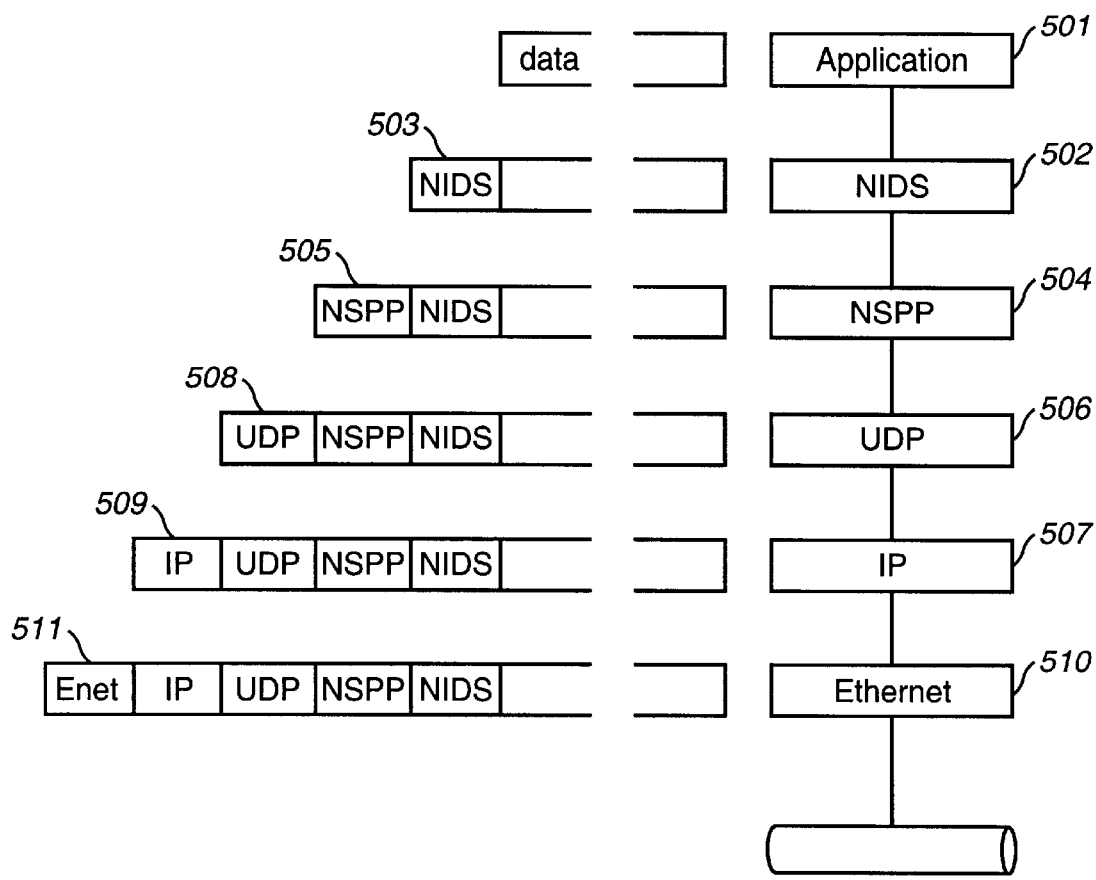
FIG. 5 displays the different message headers affixed to client request data at each level of the NSPP-based client-server interface.

FIG. 5 displays the different message headers affixed to client data at each level of the NSPP-based client-server interface. At the application level 501 there is simply the service request data, a sequence of 8-bit computer bytes that encode information used by a NIDS service in order to execute the request. A request to a general database service, for example, might be composed of one or more fields describing the operation for the NIDS service to perform in addition to information for the NIDS service to store in a database. The format for the application level data is specific to, and determined by, the particular NIDS service to which it is sent.

The next level of the interface is the NIDS API 502. The NIDS API is a collection of subroutines that the application program calls in order to request a service from a NIDS server. The NIDS API packages the request data into a NIDS message by affixing to the data a NIDS header 503. The NIDS header, to be described below in greater detail, includes fields that indicate the type of NIDS service to which the request is addressed and the specific operation requested from that service. The NIDS API then calls subroutines of the NSPP layer 504, passing to the NSPP layer the NIDS message. The subroutines of the NSPP layer package the NIDS message into an NSPP message by affixing an NSPP header 505 to the NIDS message. The NSPP message is further packaged by the UDP 506 and IP 507 layers, each layer affixing an additional header to the message passed in from the preceding layer 508 and 509. Finally, the UDP/IP message containing the NSPP message is passed by the UDP/IP socket to an Ethernet device 510 on the client computer. The Ethernet device affixes yet another header 511 to the message and transmits the message over the Ethernet to the NIDS server. Thus, in the NSPP-based client-server interface, five different headers are affixed to the application's request data during the process of sending that data via the Ethernet to the NIDS server.

Figure 6:
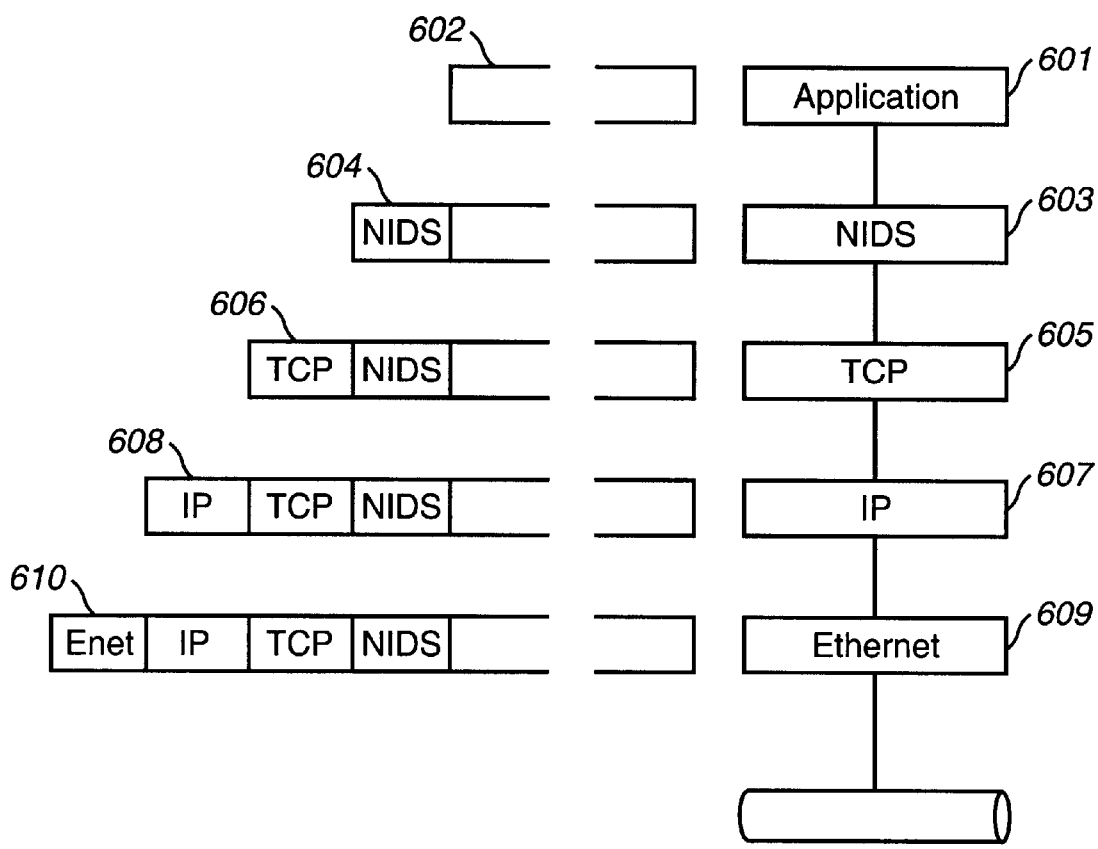
FIG. 6 displays the message headers affixed to client request data at each level of the TCP/IP-based client-server interface.

FIG. 6 displays the message headers affixed to the application's request data at each level of the TCP/IP-based client-server interface. As in FIG. 5, at the application level 601 is the data that represents the service request 602. That data is passed by the application to the NIDS API 603, which constructs a NIDS message from the data by affixing to the data a NIDS header 604. The NIDS API passes the NIDS message directly to the TCP/IP socket represented in FIG. 6 by the TCP 605 and IP layers 607. The TCP/IP socket affixes to the NIDS message a TCP header 606 and an IP header 608. The TCP/IP socket then passes the TCP/IP message to an Ethernet device running on the client computer 609. The Ethernet device adds an additional header 610 and then transmits the Ethernet message over the Ethernet to the NIDS server.

Comparison of FIGS. 5 and 6 shows that the TCP/IP-based client-server interface has fewer protocol levels and generates correspondingly fewer headers during the process of sending the request data to a NIDS server. The NSPP layer of FIG. 5 has been eliminated in the TCP/IP-based client-server interface of FIG. 6. This header is unnecessary because, as shown in FIG. 3A, the TCP/IP socket can send the service request directly to a specific NIDSCOM process associated with that service, and does not therefore need the routing information contained in the NSPP header that is used by the NIDS process to direct requests to service queues within the NIDS server.

Figure 7:
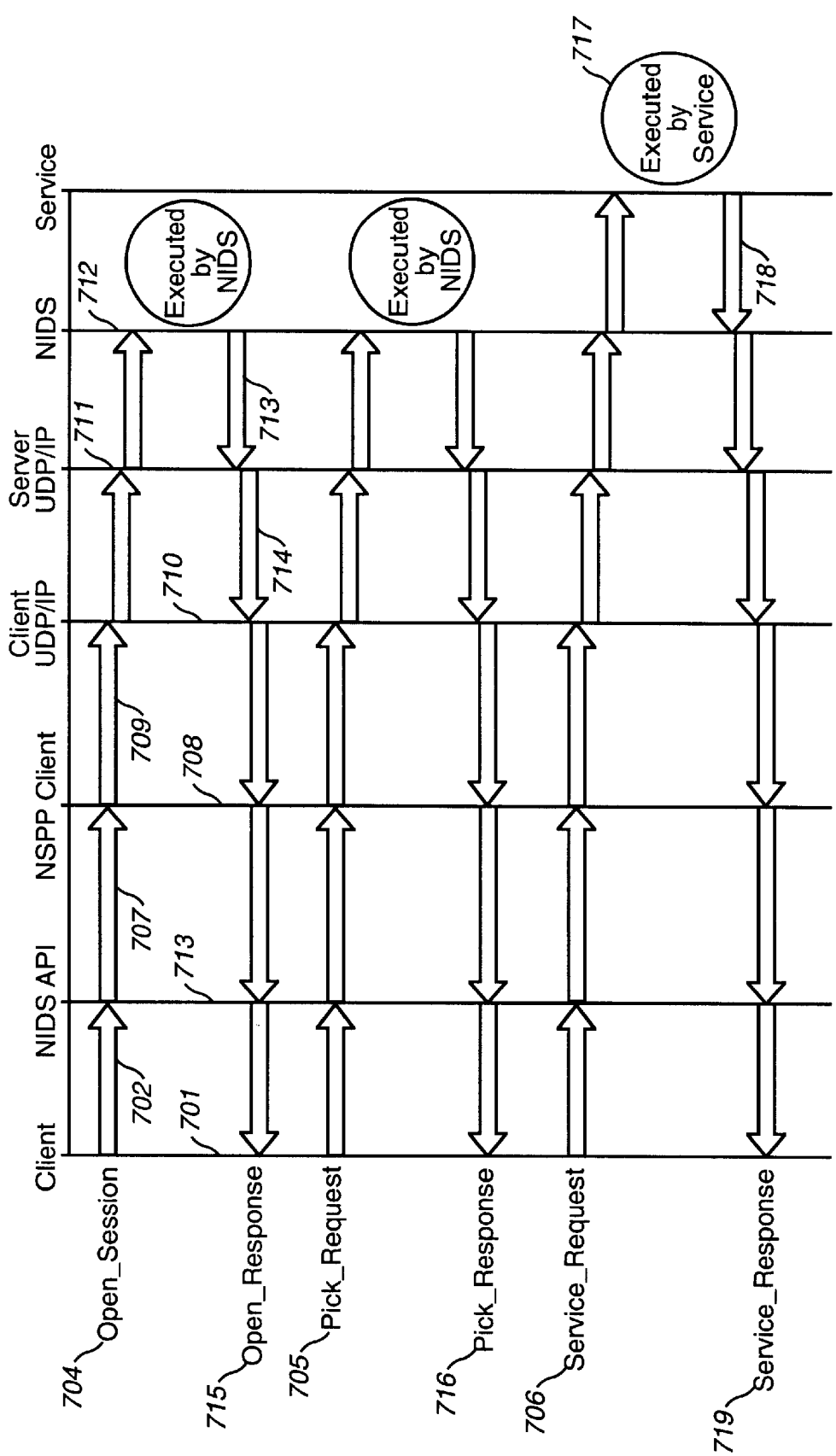
FIG. 7 displays the flow of messages through the various internal interfaces of the NSPP-based client-server interface.

FIG. 7 displays the flow of messages through the various internal interfaces within the NSPP-based client-server interface. In FIG. 7, the various interfaces through which messages are passed are shown as vertical lines, as, for example, line 701, representing the application program running on a client. Horizontal arrows indicate passing of a message from one interface to another. For example, arrow 702 represents the passing of an open_session request by the client to the NIDS API 703, the rightmost endpoint of arrow 702.

FIG. 7 displays transmission of the requests and responses necessary in the NSPP-based client-server interface to open a session, pick a specific service, and request one specific operation from a NIDS service. These operations include open_session 704, pick_request 705, and service_request 706. The open_session request passes through the NIDS API 703 to the NSPP client subroutines 707, all within the context of the application program, indicated in FIG. 7 by the three arrows 702, 707, and 709 occurring at the same horizontal level of the figure. The message is then passed to the client UDP/IP socket 710 from where it is broadcast over the Ethernet to the server UDP/IP socket 711. The message is then passed to the NIDS process running on the NIDS server 712. The NIDS process unpackages the NSPP message from the received UDP/IP message and uses the information in the NSPP header in order to update the client table entry corresponding to the client that sent the open_session request. In the case that the client is not currently registered with the NIDS server, a new client table entry is created and entered into the client table. The NIDS process then constructs and sends a response message back through the server UDP/IP socket 713, which transmits the message over the Ethernet back to the client UDP/IP socket 714. From there, the response message ascends the client protocol layers back to the client application program, arriving there as an open_response message 715.

A pick_request 705 is then sent by the client to the NIDS process in the same fashion. This request basically tells the NIDS process which service the client intends to make use of over the newly opened connection. In response to this request, the NIDS process creates a new service table entry corresponding to the requested service, enters the service table entry into the service table, and returns a pick_response to the client application 716. Finally, the client requests a specific operation from the requested service in a service_request message 706 that is sent in the same fashion as the previous two messages to the NIDS process on the NIDS server. The NIDS process queues the service_request to the requested service, which then executes the request 717. The requested service then passes a service_response back to the NIDS process 718 which transmits the service_response back to the client by the same process used to transmit the other two responses 715 and 716 back to the client 719.

Figure 8:
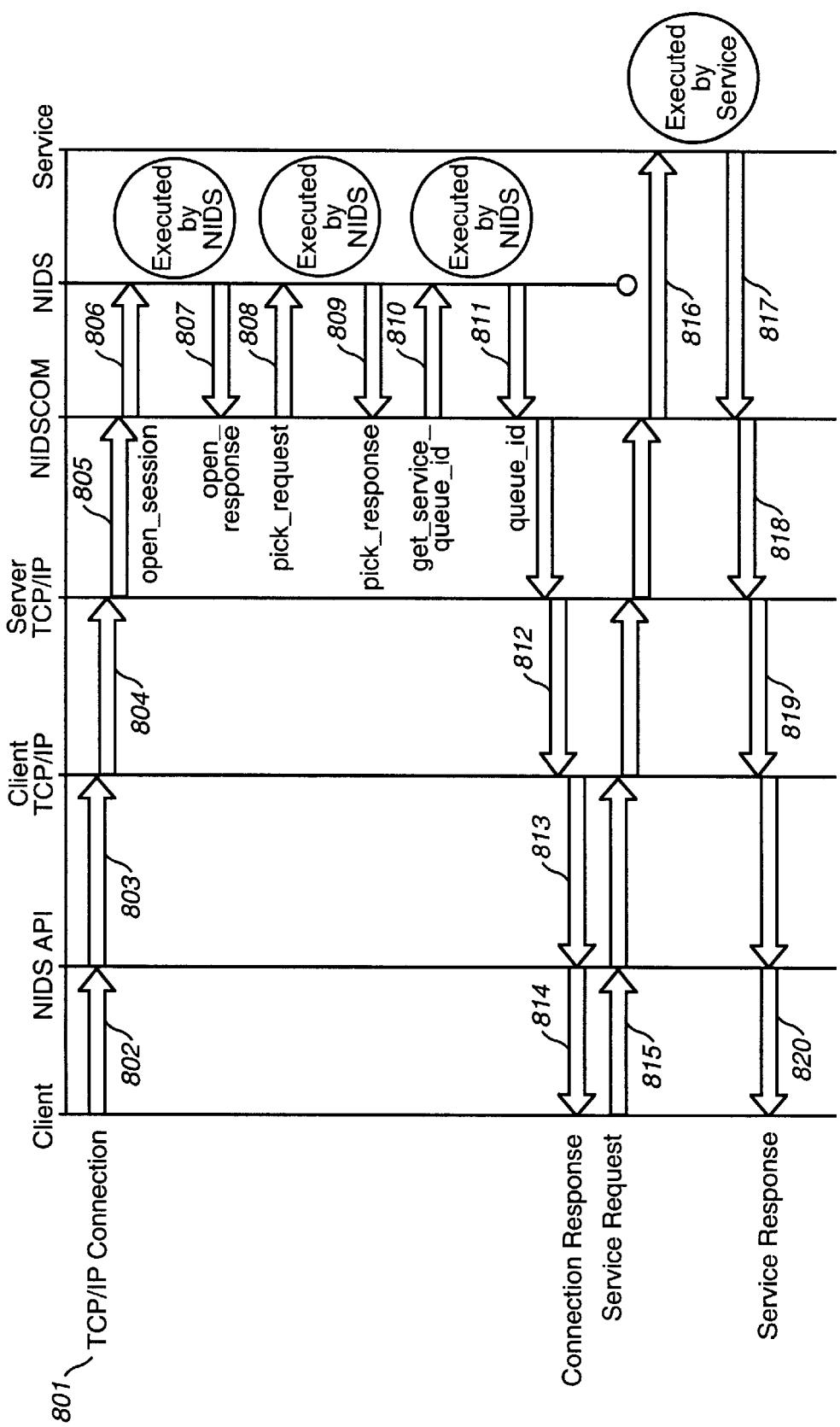
FIG. 8 displays the flow of messages through the various internal interfaces of the TCP/IP-based client-server interface.

FIG. 8 displays the flow of messages through the various internal interfaces of the TCP/IP-based client-server interface. Comparison of FIGS. 7 and 8 reveals the markedly different sequencing and flow of messages between clients and NIDS servers using the NSPP-based client-server interface and clients and servers using the TCP/IP-based client-server interface. A first difference is that, in order to make a connection to a specific NIDS service and to request execution of an operation by that service, a client using the TCP/IP-based client-server interface needs to send only two requests. The first request is a standard TCP/IP connection request 801. The client application calls the NIDS API 802 to make the connection. The NIDS API calls a well-known TCP/IP function 803 to establish a connection with the logical port on the NIDS server that corresponds to the service requested through the NIDS API. The client's TCP/IP socket transmits the TCP/IP connection request to the server's TCP/IP logical port corresponding to the NIDS service to which the client wishes to connect 804. The TCP/IP socket corresponding to that logical port passes the message to the NIDSCOM process associated with the service 805. The NIDSCOM process then conducts a dialog with the NIDS process on the NIDS server that handles the UDP/IP-based NSPP interface. This is the same NIDS process that executes the first two requests in FIG. 7. In fact, the NIDSCOM serves as a proxy or agent on the NIDS server for the client. The NIDSCOM process executes the same open_session and pick_request requests 806–809 made by a client under the NSPP-based client-server interface shown in FIG. 7 The NIDSCOM process makes an additional get_server_queue request 810 to the NIDS process and obtains the service message queue ID in the response 811 from the NIDS process. Finally, the NIDSCOM process stores the new connection information in the NIDS data tables and calls the server's TCP/IP socket to send a TCP/IP connection response back to the client TCP/IP socket 812. From there, the connection response ascends through the NIDS API back to the client as a response to the connection request 814. The client then requests a service through the NIDS API 815, which sends the request via the client's TCP/IP socket to the TCI/IP logical port associated with the NIDSCOM process corresponding to the requested service. That NIDSCOM process directly queues a service request onto the service queue 816, bypassing the NIDS process altogether, but making use of information stored in the NIDS data tables maintained by the NIDS process.

When the NIDS service has executed the request, the NIDS service sends a response directly back to the NIDSCOM process 817 which then passes it back to the server TCP/IP socket associated with the NIDSCOM process 818. From there the service response message is transported over the Ethernet 819 back to the client TCP/IP socket and ascends the protocol levels through the NIDS API back to the client application program 820.

In the TCP/IP-based client-server interface, requests and responses pass through fewer internal interfaces than in the UDP/IP-based client-server interface. The NIDS process on the NIDS server is completely avoided for service requests. Furthermore, there is no need for the NSPP layer on the client side. The end result is that the client application needs fewer components and is able to use the widely available industry standard TCP/IP protocol rather than the less commonly available UDP/IP-based NSPP protocol.

The subroutines of the NIDS API serve to create a NIDS message header and affix it to the data corresponding to a client request to produce a NIDS message. The NIDS API then sends the NIDS message to the specific TCP/IP logical port on the NIDS server that correspond to the service requested by the client.

Figure 9:
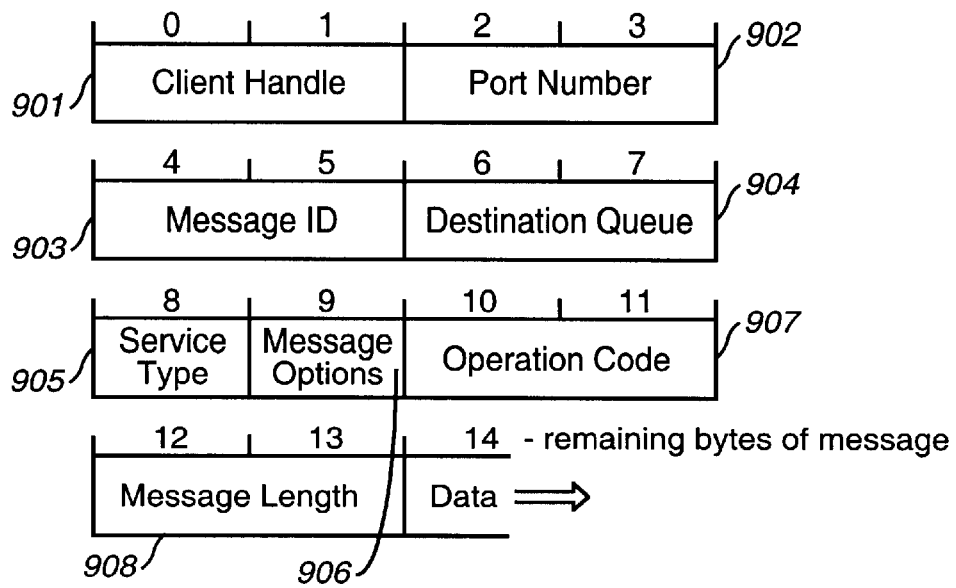
FIG. 9 displays a NIDS message header.

FIG. 9 displays the format for a NIDS message header. The NIDS message header comprises fourteen 8-bit bytes. Directly following the NIDS message header are the remaining data of the message that correspond either to a service request or to a response from the service to the client. The first field in the NIDS message header contains a client handle 901. Under the current implementation of the TCP/IP-based client-server interface, the client handle field is unused. The second field in the NIDS message header contain a port number 902. The port number is used by a multi-threaded client to identify the correspondence between a particular thread of the client and a request made by that thread. In essence, the port number is a thread identifier. The third field of the NIDS message header contains a message ID 903. The message ID field contains an arbitrary number selected by a client to identify a request. When a response to the request is returned to the client, the client can match the message ID in the response NIDS message header to the selected message ID that the client included in the original request in order to verify that the response matches the request. The fourth field in the NIDS header contains a destination queue field. This field is not used by the client. Instead, it is filled in by the NIDSCOM process upon receipt of the NIDS message in order to direct the db_proc process corresponding to the requested service to send a response to the request back to that same NIDSCOM process. The fifth field in the NIDS header contains a service type 905. The service type identifies the type or class of service being requested. There are a number of different categories of NIDS services, to be listed below. The sixth field 906 contains message options. Currently only the lowest bit of this 1-byte field is used. When that bit is on, the lowest bit indicates that the data following the NIDS message header has been encoded in abstract syntax notation ("ASN-1"). The seventh field in the NIDS message header is the operation code 907. This 2-byte field indicates the specific service operation requested by the application process. Each different type of NIDS service has a unique set of operation codes that correspond to that service. The service type field indicates the specific NIDS service to which the NIDS message is directed, and the operation code directs that NIDS service to execute a specific operation. The final field in a NIDS message header contains the message length 908. This is the length of the entire NIDS message including the 14 bytes in the NIDS message header.

The following table displays service type codes used in the service type field 905 of the NIDS message header. The hexadecimal code in the first column of the table corresponds to the NIDS service shown in the second column of the table. The NIDS services include a number of general database management services for storing and retrieving data as well as various telecommunications services.

| Code | Service Type |
|---|---|
| 80 | Test Services |
| EC | MAGIC Service |
| EF | Operational Measurements |
| FO | C-tree Service |
| F1 | Validation Service |
| F2 | Binary File Service |
| F3 | Remote Console Service |
| F4 | Database Management Service |
| F5 | Audio Service |
| F6 | Connection Service |
| F7 | Down Load Service |
| F8 | Switch Service |
| F9 | Alarm Service |
| FA | Valdb Service |
| FB | Stentor Lidb Service |
| FC | IN Gateway Service |
| FD | Coupon Validation Service |
| FE | Relational Database Service |

The following table displays hexadecimal service operation codes for the MAGIC service. The MAGIC service is a generalized service request facility provided by a NIDS server. The MAGIC service is used to quickly and efficiently provide any number of specific services that can be adapted to use the general request and response paradigm of the MAGIC service.

| Magic Opcodes | |
|---|---|
| 4101 | Open Service |
| 4102 | Open Service Response |
| 4103 | Request with No Response |
| 4104 | Request with Response |
| 4105 | Response |
| 4106 | Server Request with No Response |
| 4107 | Server Request with Response |
| 4108 | Server Request Response |
| 4109 | Close Service |
| 410A | Close Service Response |
| 410B | Control |
| 410C | Control Response |

The following table displays hexadecimal service operation codes for the C-tree service. The C-tree service is a database service provided by an underlying C-tree database. The basic operations supported by the C-tree service include inserting, searching for, and deleting information from a C-tree database.

| C-Tree Opcodes | |
|---|---|
| 4001 | Insert Request |
| 4002 | Search Request |
| 4003 | Delete Request |
| 4004 | Search Response |
| 4005 | Insert Response |

-continued

C-Tree Opcodes

| | |
|---|---|
| 4006 | Delete Response |
| 4007 | Serv Def Request |
| 4008 | Serv Def Response |

Figure 10:
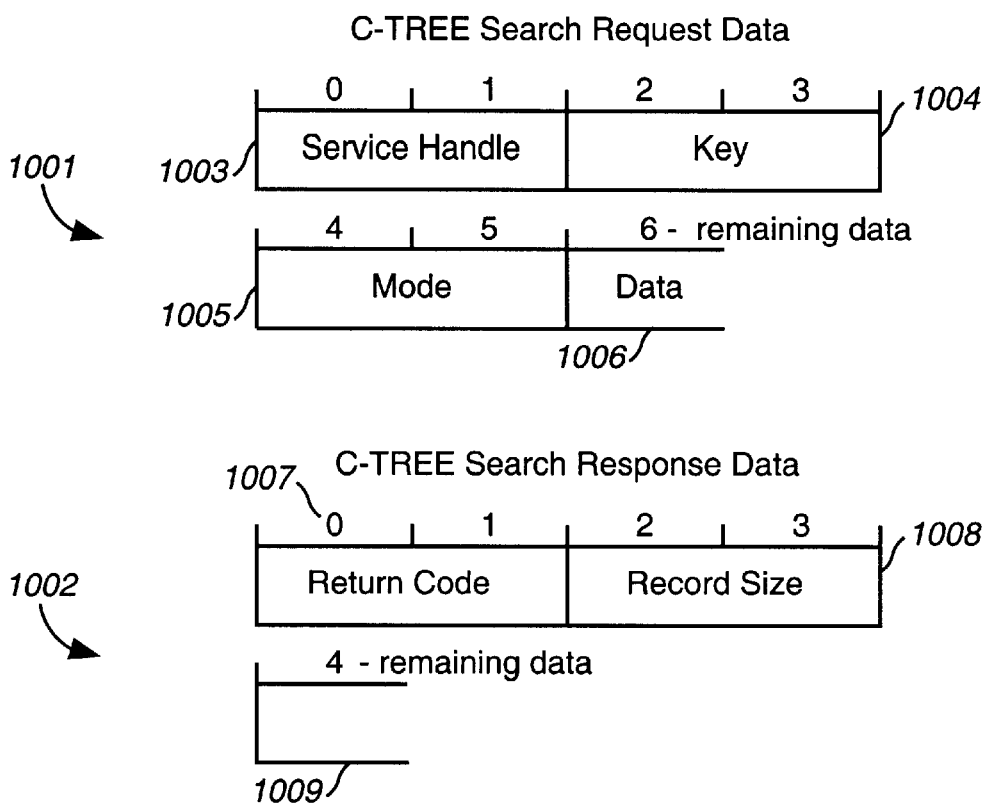
FIG. 10 displays the format for the request and response data that occur in a NIDS message following the NIDS message header for a C-tree search operation.

FIG. 10 displays the formats for the request and response data that occur following the NIDS message header for a C-tree search request and a C-tree search response message. The search request message 1001 comprises a service handle 1003, a C-tree database key 1004, an insert/update mode 1005, and the remaining data that specifies the search parameters 1006. The search response format 1002 includes a return code 1007, a record size 1008, and the data generated in response to the search request formatted into records of the specified record size 1009. Each different operation supported by each different NIDS service may similarly specify a specific format for the request and response data.

Although the present invention has been described in terms of one embodiment, it is not intended that the invention be limited to this embodiment. Modifications within the spirit of the invention would be apparent to those skilled in the art. For example, different fields and different orderings of fields might be used within a NIDS header in order to contain the information needed by a NIDSCOM process to place a client's request into the appropriate service queue. As another example, different process hierarchies might be employed in the NIDS server for handling TCP/IP communications. The scope of the present invention is defined by the claims that follow.

What is claimed is:

1. A TCP/IP communication interface between a client computer and a Network Information Distribution Services server that enables the client computer to send data that represents a service request to a service provided by the Network Information Distribution Services server, comprising:

a Network Information Distribution Services message header that is affixed to the data that represents the service request to create a Network Information Distribution Services message, the Network Information Distribution Services message header comprising:

a first client handle field;

a second port number field for holding a client thread identifier;

a third message ID field for holding a unique message identifier;

a fourth destination queue field used by the Network Information Distribution Services server for internal queuing;

a fifth service type field for holding an indication of the service to which the message is directed;

a sixth message options field for holding an indication of a data encoding scheme used for the message;

a seventh operation code field for holding an indication of the service request; and an eighth message length field for holding an indication of the total length of the message.

2. The Network Information Distribution Services message header of claim 1 wherein:

the service type field indicates the type of service to which the service request represented by the Network Information Distribution Services message is directed;

the first bit of the message options field indicates whether the data that represents a service request is ASN-1 encoded;

the operation code field indicates the service request; and the message length field indicates the total length, in bytes, of the Network Information Distribution Services message including the Network Information Distribution Services message header.

3. A system for providing a TCP/IP-based interface between a client computer and a NIDS server that enables the client computer to send data that represents a service request to a service provided by the NIDS server, the system comprising:

software routines that compose a NIDS API on the client computer, wherein the NIDS API is called by a client software application program to construct a NIDS message header and affix the NIDS message header to the data that represents the service request in order to create a NIDS message;

a TCP/IP socket on the client computer having a logical TCP/IP port address, wherein the client computer TCP/IP socket receives a NIDS message from the NIDS API for transmission to the NIDS server;

a first TCP/IP socket on the server computer having a logical TCP/IP port address to which the client TCP/IP socket transmits the NIDS message;

a NIDSCOM process associated with the first TCP/IP socket on the server computer and associated with a service queue, wherein the NIDSCOM process receives the NIDS message from the server TCP/IP socket and verifies the data contained in the NIDS message header;

a service queue in which the NIDSCOM process places the NIDS message;

a service process associated with the service queue, wherein the service process retrieves the NIDS message from the service queue and executes the request that the data contained in the NIDS message represents.

4. The system of claim 3 wherein the service process passes a response message back to the NIDSCOM process after executing the service request, wherein the NIDSCOM process in turn passes the response message back to the first server TCP/IP socket, and wherein the first server TCP/IP socket transmits the response message back to the TCP/IP logical port address of the TCP/IP socket on the client.

5. The system of claim 3 further including:

software routines on the client computer called by a client software application program that pass ASCII text-based data that represents a service request to the client TCP/IP socket;

a second TCP/IP socket on the server computer to which the client TCP/IP socket transmits the ASCII text-based message, the second TCP/IP socket having a logical TCP/IP port address different from the logical TCP/IP port address of the first TCP/IP socket;

an ASCIICOM process associated with the second TCP/IP socket on the server computer and associated with the NIDSCOM process, wherein the ASCIICOM process receives the ASCII text-based message from the second server TCP/IP socket, constructs a NIDS message from the ASCII text-based data that represents a service request, and passes the constructed NIDS message to the NIDSCOM process.

6. The system of claim 5 wherein the service process passes a response message back to the NIDSCOM process after executing the service request, wherein the ASCIICOM creates an ASCII text-based response message from the passed response message and passes the ASCII text-based response message back to the second server TCP/IP socket, and wherein the second server TCP/IP socket transmits the response message back to the TCP/IP logical port address of the TCP/IP socket on the client.

7. A method for sending a service request from a client computer to a service provided by a Network Information Distribution Services server, the method comprising:

selecting a TCP/IP logical port address that corresponds to the service provided by a Network Information Distribution Services server;

requesting a TCP/IP connection to the selected TCP/IP logical port address via a TCP/IP socket on the client computer;

collecting data that describes the service request;

formatting the collected data for reading by the service;

constructing a Network Information Distribution Services message header for the service request and affixing the Network Information Distribution Services message header to the formatted data to create a Network Information Distribution Services message; and passing the Network Information Distribution Services message to a TCP/IP socket on the client computer for transmission to the selected TCP/IP logical port address.

8. The method of claim 7 wherein the Network Information Distribution Services message header is a data block comprising:

a first client handle field;

a second port number field;

a third message ID field;

a fourth destination queue field;

a fifth service type field;

a sixth message options field;

a seventh operation code field; and an eighth message length field.

9. The method of claim 8 wherein constructing a Network Information Distribution Services message header further comprises:

allocating a data block for the a Network Information Distribution Services message header;

setting the service type field to a value that indicates the type of service to which the service request is directed;

when the formatted data is ASN-1 encoded, setting the first bit of the message options field to one;

when the formatted data is not ASN-1 encoded, setting the first bit of the message options field to zero;

setting the operation code field to a value that indicates the service request; and setting the message length field to a value that equals the total length, in bytes, of the Network Information Distribution Services message, including the Network Information Distribution Services message header.

10. The method of claim 7 wherein the service receives the service request message, executes the service request, generates data that represents a response to the service request, and returns to the client computer a response message comprising a Network Information Distribution Services message header affixed to the data that represents a response to the service request.

* * * * *